Nov. 18, 1941.     M. P. ROBINSON     2,263,398
APPARATUS FOR WATER PURIFICATION
Filed Aug. 3, 1938

INVENTOR.
Merrill P. Robinson
BY Edward Thomas,
his ATTORNEY.

Patented Nov. 18, 1941

2,263,398

UNITED STATES PATENT OFFICE 2,263,398

APPARATUS FOR WATER PURIFICATION

Merrill P. Robinson, Upper Montclair, N. J.

Application August 3, 1938, Serial No. 222,772

5 Claims. (Cl. 210—16)

This invention relates to an apparatus for water purification and is herein illustrated as embodied in water softening procedures wherein chemical reagents introduced into the water react with the impurities, largely precipitating them and sometimes destroying their ability to react undesirably with soap.

Such procedures are very old, but many difficulties have been encountered in getting rid of the precipitate in eliminating heat losses, and in cleaning filters. Some of the difficulties arise from the too rapid flow of the water from which the precipitate is settling, other difficulties arise from the need to frequently clean the sand or other material which effects the filtering, still other difficulties arise from the highly gelatinous nature of part or all of the precipitate obtained in softening many hard waters.

It has been common to cause the chemical reactions of water softening to take place in a tank having an inverted conical bottom and to draw off the purified water through a smaller submerged cone, but it has been found that precipitates build up on the conical bottom and sometimes rise high enough to close the opening between the cones. Moreover, it is found that the usual flow off valve at the apex of the bottom cone does not cause a wide enough current of water within the cone to properly wash out the precipitate.

It is also found that the narrow opening between the submerged cone and the sides of the tank causes the water current to speed up at that point where it is supposed to deposit the precipitate and again speed up as it flows toward the apex of the cone, thus preventing further depositing of the precipitate except for that believed to be thrown out by the slight centrifugal action of the turning current of water where it turns at the edge of the submerged cone.

In order to avoid the disadvantages of washing the filter sand or other material with cold water, hot wash water has been drawn from the settling tank and returned to the tank to settle the impurities there, thus eliminating the deterioration of the filter material due to violent changes of temperature and preventing precipitation of impurities in hard masses, but the speed of water flow needed for washing the filter is several times as great as the speed of flow used during normal precipitation and filtration, with the result that the returned wash water laden with impurities violently agitates the water in the tank, interferes with the normal chemical reactions and sometimes forms hard cement-like deposits throughout the apparatus and the filter. All these adverse results are aggravated by the appreciable cooling of the wash water which, therefore, when returned near the top of the tank sets up differential temperatures causing rapid passage of some of the returned water through the treating tank, and back to the filter.

According to the present invention these and other difficulties and objections are overcome and a device and process are provided which provide a slow-moving current of water during precipitation and provide substantially clean wash water for washing the sand or other filtering medium—water at the same temperature as the water usually filtered, and the wash water is returned for reuse.

Other features and advantages will hereinafter appear.

Figure 1:
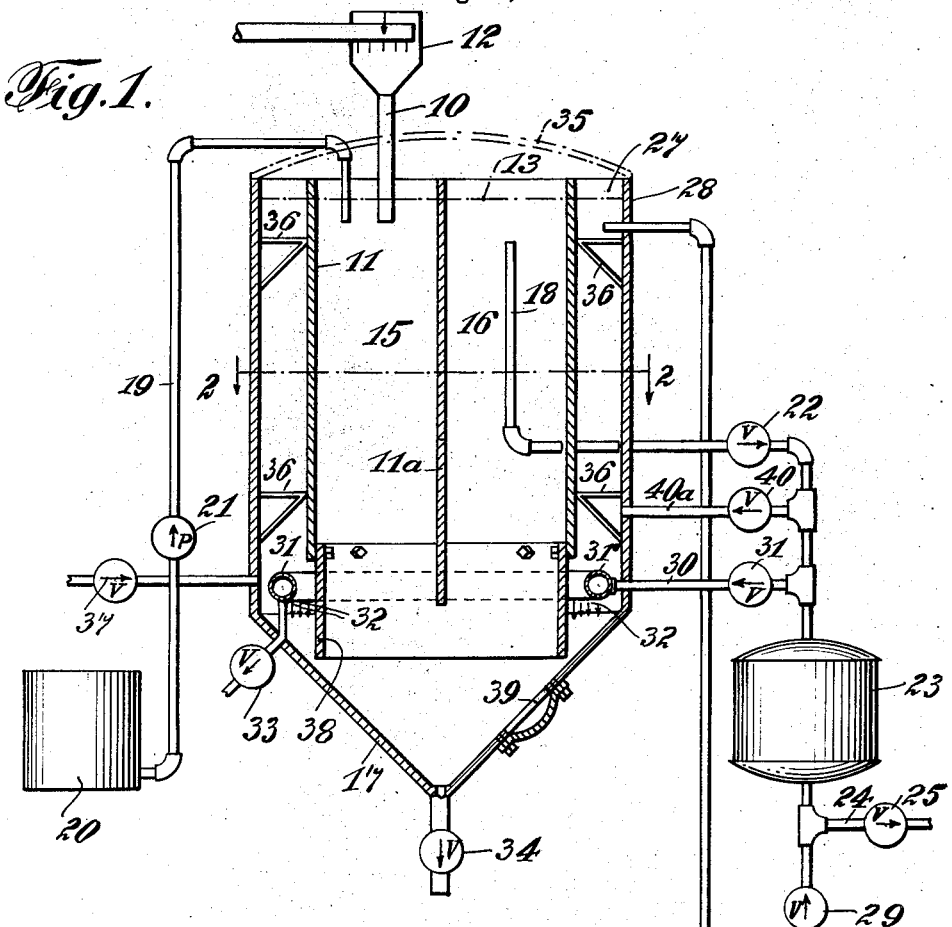
Figure 1 is a sectional side view on the line 1—1 of Figure 2 of an apparatus embodying the invention.
Figure 2:
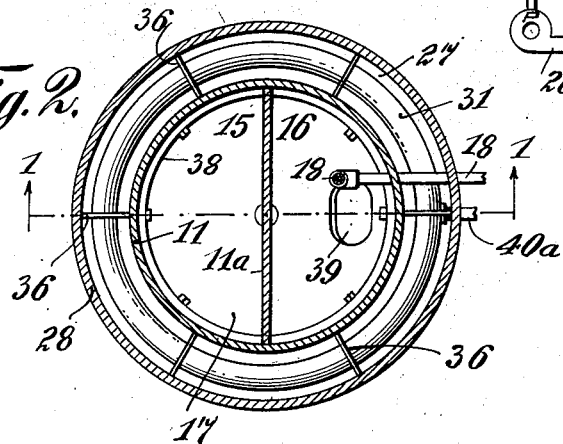
Figure 2 is a horizontal section on the line 2—2 of Figure 1.

In the form of the invention herein shown, hard water, or other liquid to be treated, flows through a pipe 10 into a tank 11. In the form shown the water entering the intake pipe 10 flows through a heater diagrammatically shown at 12, and the water level is maintained at a level indicated by the line 13. In the form shown the tank 11 is circular and is divided by a partition 11a into a down flow compartment 15 and an up-flow compartment 16. In the form shown the partition or baffle 11a extends above the waterline 13 and terminates well above the bottom of the tank 11 which is shown as an inverted cone 17, so that water entering through the tank 11 flows slowly until it passes off through the outflow pipe 18 near the water line 13 shown in the center top of the up flow compartment 16.

Water entering through the intake 10 soon encounters suitable chemicals in solution which enter the down flow compartment 15 near the water line through a chemical intake pipe 19 to which the chemicals are shown as delivered in solution from a tank 20 by a pump 21.

The chemicals react with the impurities in the water and form a precipitate, often gelatinous, which settles on the cone 17 as the inflowing current flows slowly downwardly and then upwardly, the low speed being indicated by a usual size of four feet or more in diameter for the tank 15. The water often flows through the tank 11 at one gallon per minute.

After the precipitate has settled the outgoing water passes through the outflow pipe 18, through the wall of the tank 11, and valve 22 to a filter 23 where it passes downwardly through a layer of granular carbon or other suitable media (not shown) in which it deposits the last traces of precipitate, and then finally is discharged for use as pure water through a pipe 24 and valve 25.

The carbon or other filtering medium in the filter 23 is washed at intervals to remove contaminating precipitate. To effect this washing the valves 22 and 25 are closed and a pump 26 is started to draw water from a jacket 27 formed by an annular wall 28 around the tank 11, so the wash water is at the same temperature as the water in the tank 11; and a valve 29 between the pump and the filter is opened so that pumped wash water at a relatively high speed from the jacket 27 agitates the carbon or filter material in the filter 23, washing it and then passes off through a pipe 30, connected through a normally closed valve 31 (now open).

The pumped water passing through the pipe 30 is shown as entering an annular pipe 31' lying near the bottom of the tank and as discharging the wash water and its entrained precipitate through bottom jets indicated by arrows 32.

The bottom of the jacket 27 is shown as part of the cone 17 and the tank wall 11 is shown as slightly spaced from the cone 17, to form an annular opening so that the entrained precipitate from the wash water rolls down the cone 17, being thrown out of the jets 32 by centrifugal action since the issuing water turns upward to keep the water level uniform.

The water in the jacket is obviously at the temperature of the contents of tank 11 so there is no chilling of the filter. Moreover, the contents of the tank 11 remains undisturbed by the water entering through the pipe 31, because the slightly cooler water is introduced at the bottom where it naturally remains, and, moreover is separated from the main body of reacting water by the wall of the tank 11.

If desired the wash water laden with precipitate may be blown off through a valve 33. The precipitate in the cone 17 may be drawn off from time to time through an apex valve 34.

Often the tank 11 is closed by a welded on cover 35 extending over the wall 28, and the wall 28 is usually supported by welded brackets 36 on the tank 11.

The opening between the tank wall 11 and the cone 17 through which precipitate from the wash water can pass, may be closed if the blow off valve 33 is used.

Water may be admitted to the lower part of the jacket 27 by a valve 37.

In the form shown the lower wall of the tank 11 is in the form of a ring, the wall 11 proper terminating above the pipe 31. The ring 38 is shown as bolted to the wall 11 thus enabling the ring to be removed and the pipe 31 altered or inserted.

If it is desired to return some of the wash water to the jacket 27 without passing the jets 32, the valves 22 and 31 may both be closed and a valve 40 opened to deliver the wash water through a pipe 40a above the pipe 30.

Access to the interior is provided by a normally closed manhole, 39.

Having thus described one embodiment of the invention, what is claimed is:

1. A hot water chemical precipitating tank for softening water having a down-flow compartment and an up-flow compartment, an annular wall surrounding said tank and forming a wash water compartment for heating, settling sediment and storage of a supply of water well adapted to back-washing a filter because of its freedom from chemicals and chemical precipitates and other turbidities, said annular wall having a sloping bottom forming a sediment collection space, said tank spaced from said sloping bottom to form an annular opening for passing sediment from the sloping bottom of the wash water settling and storage compartment into said sediment collection space, a filter for the softened water, and means for circulating settled wash water from a point near the top of the wash water compartment through said filter and thence back to a point near the bottom of the wash water compartment for settling and re-use.

2. A hot water chemical precipitating tank for softening water having a down-flow compartment and an up-flow compartment, an annular wall surrounding said tank and forming a wash water compartment for heating, settling sediment, and storage of a supply of water well adapted to back-washing a filter because of its freedom from chemicals and chemical precipitates and other turbidities, said annular wall including a sloping bottom forming a sediment collection space, said tank spaced from said sloping bottom to form an annular opening to pass sediment from the wash water compartment into the sediment collection space, a filter for the softened water, means for circulating settled wash water from a point near the top of the wash water compartment through said filter and back to a point near the bottom of the wash water compartment for settling and re-use, and a conduit having a plurality of outlet openings therein for uniformly distributing the return wash water near the bottom of the wash water compartment.

3. A hot water chemical precipitating tank for softening water having a down-flow compartment and an up-flow compartment, an annular wall surrounding said tank and forming a wash water compartment for heating, settling sediment, and storage of a supply of water well adapted to back-washing a filter because of its freedom from chemicals and chemical precipitates and other turbidities, said annular wall including a sloping bottom forming a sediment collection space, said tank spaced from said sloping bottom to form an annular opening to pass sediment from the wash water compartment into the sediment collection space, a filter for the softened water, means for circulating settled wash water from a point near the top of the wash water compartment through said filter and back to a point near the bottom of the wash water compartment for settling and re-use, and an annular conduit in said wash water compartment and provided with a plurality of openings for directing the returned wash water in downward uniformly distributed jets about the lower part of the compartment.

4. A hot water chemical precipitating tank for softening water having a down-flow compartment and an up-flow compartment, an annular wall surrounding said tank and forming a wash water compartment for heating, settling sediment, and storage of a supply of water well adapted to back-washing a filter because of its freedom of chemicals and chemical precipitates and other turbidities, said annular wall including a sloping bottom forming a sediment collection space, said tank spaced from said sloping bottom to form an annular opening to pass sediment from the wash water compartment into the sediment collection space, a filter for the softened water, means for circulating settled wash water from a point near the top of the wash water compartment through said filter and back to a point near the bottom of the wash water compartment for settling and re-use, and a conduit for discharging the return filter wash water to the wash water compartment and facilitating movement of sediment along said sloping bottom into the sediment collection space.

5. A hot water chemical precipitating tank for softening water having a down-flow compartment and an up-flow compartment, an annular wall surrounding said tank and forming a wash water compartment for heating, settling sediment, and storage of a supply of water well adapted to back-washing a filter because of its freedom from chemicals and chemical precipitates and other turbidities, said annular wall including a sloping bottom forming a sediment collection space, said tank spaced from said sloping bottom to form an annular opening to pass sediment from the wash water compartment into the sediment collection space, a filter for the softened water, means for circulating settled wash water from a point near the top of the wash water compartment through said filter and back to a point near the bottom of the wash water compartment for settling and re-use, a conduit in said wash water compartment and connected to said wash water circulating means for discharging the return filter wash water against said sloping bottom, and a pump embodied in said circulating means for imparting relatively high velocity to the filter wash water so as to ensure flushing of said conduit.

MERRILL P. ROBINSON.